June 13, 1967 H. HAUS 3,325,604

HOLDING DEVICE FOR A TELEPHONE HANDSET

Filed June 17, 1963

4 Sheets-Sheet 1

HOLDING DEVICE FOR A TELEPHONE HANDSET

Filed June 17, 1963

United States Patent Office 3,325,604
Patented June 13, 1967

3,325,604
HOLDING DEVICE FOR A TELEPHONE HANDSET

Hans Haus, Am Stephanshugel 10, Limburg, Germany

Filed June 17, 1963, Ser. No. 288,084
Claims priority, application Germany, June 19, 1962, H 46,122; Apr. 19, 1963, H 49,000
5 Claims. (Cl. 179—157)

This invention relates to a holding device for a telephone handset and, more particularly, to apparatus arranged to support a telephone hand-set, consisting of a receiver and microphone, in such a manner that the user's hands are free for other operations.

Up to the present time, devices have been used with telephone handsets to free the hands in the form of shoulder supports consisting mostly of an attachment connected to the handle of the receiver and swingably supported on a yoke. With such devices, it has been possible to place the support on the cradle of the telephone, when it was not being used; when in use, the yoke rested on the user's shoulder with the receiver opposite his ear. This type of shoulder support has a major disadvantage in that the stability of the support is only guaranteed when the person using the telephone remains relatively quiet. They do not operate properly, when the person using the telephone is required to bend forward or backward, or to stand up and sit down again. In many occupations such movements are necessary, for example, in performing the work of a file cleck or an information clerk. In those jobs it has been realized that some stable method of supporting the receiver on the shoulder be found. There have been many suggestions attempting to meet these disadvantages. Most devices attempting to accomplish this take up considerable space and so restrict the use of the apparatus to a certain type of application. In some cases, the operation of the device is such that it is necessary that the person using it has had some experience with devices of this kind. These and other difficulties experienced with the prior art have been obviated in a novel manner by the present invention.

It is therefore, an outstanding object of the invention to provide a holding device for a telephone handset which will remain in a fixed position on the operator's shoulder, irrespective of body motions.

Another object of the invention is the provision of a holder for a telephone handset which is simple in construction, which is inexpensive to manufacture, and which requires no particular skill to use.

A further object of the present invention is the provision of a holding device for a telephone handset for use on the shoulder of the operator, in which the position of the telephone may be readily and simply adjusted as desired.

It is another object of the present invention to provide a support for a telephone on the shoulder of the operator having a portion which remains with the operator and another portion which remains with the telephone handset, neither part being bulky or heavy, nor interfering with the normal body movements of the operator or of placing the handset in the cradle of the telephone.

With these and other objects in view, as will be apparent to those skilled in the art, the invention resides in the combination of parts set forth in the specification and covered by the claims appended hereto.

The character of the invention, however, may be best understood by certain of its structural forms, as illustrated by the accompanying drawings in which.

Figures 4, 5:
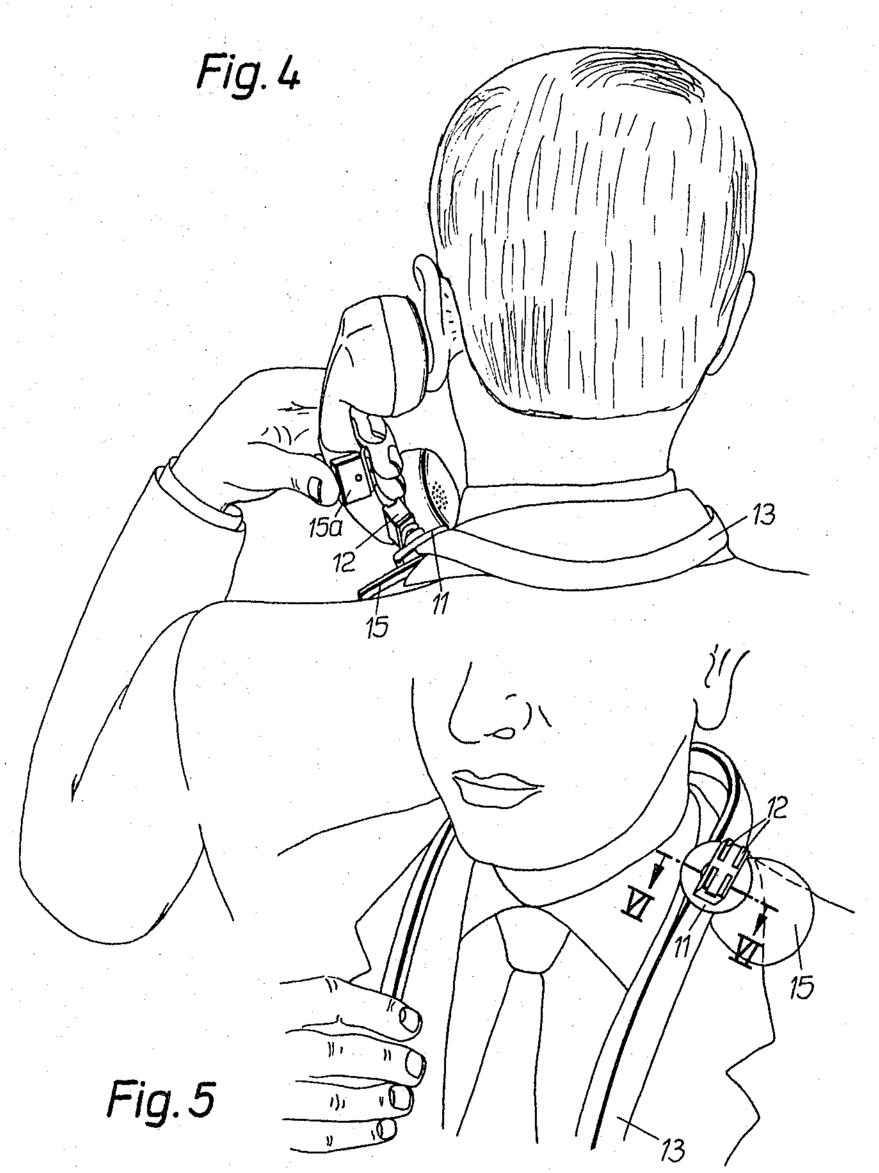
Figure 6:
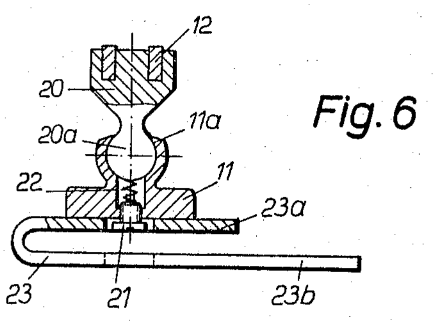
Figure 7:
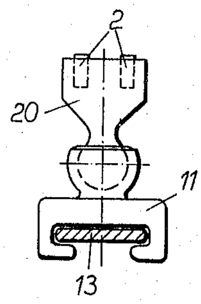
Figure 11:
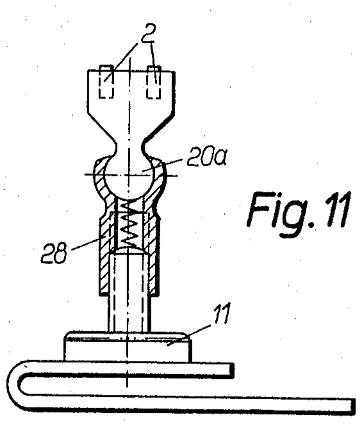
Figure 10:
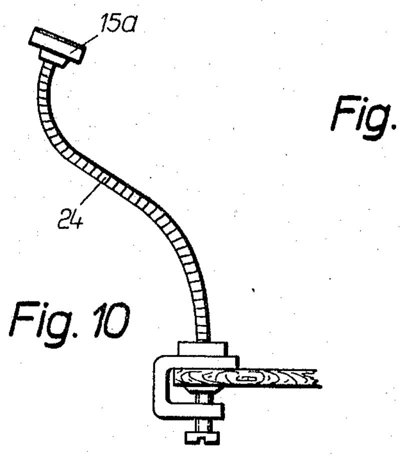
Figure 8:
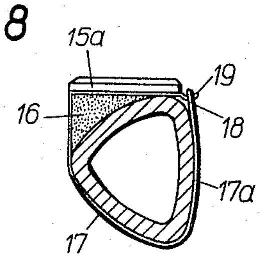
Figure 9:
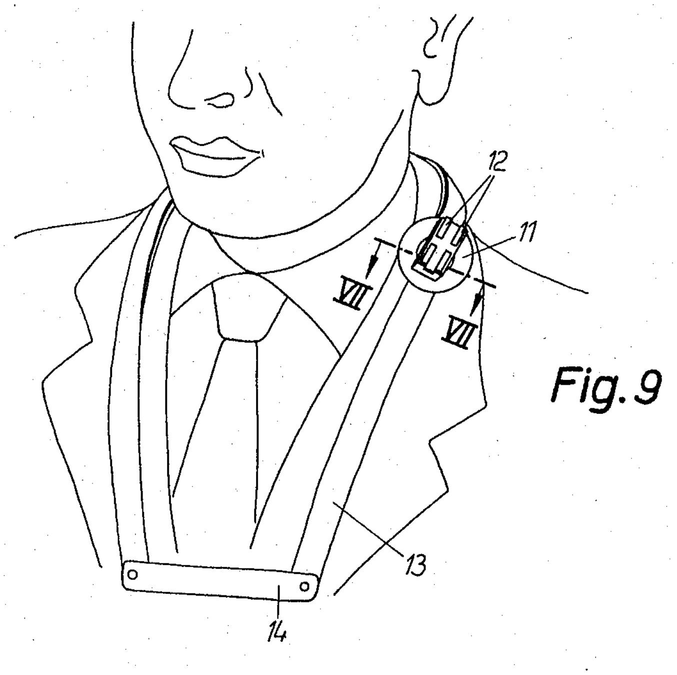
Figure 12:
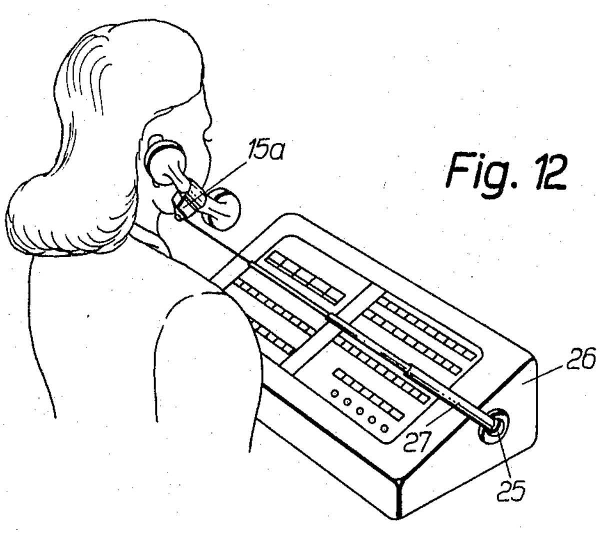

FIG. 4 is a perspective view showing the holding device in use with a telephone handset by an operator taken from the rear as viewed from the rear by the operator, FIG. 5 shows a portion of the apparatus as viewed from the front of the operator, FIG. 6 is a sectional view of a portion of the invention taken on the line VI—VI of FIG. 5, FIG. 7 is a sectional view of the device taken on the line VII—VII of FIG. 9, FIG. 8 is a sectional view of telephone handset and holding device embodying another embodiment of the invention, FIG. 9 shows a variation of the invention, FIG. 10 shows another embodiment of the invention, FIG. 11 is a sectional view of another embodiment of the invention, and FIG. 12 is a perspective view of a still further embodiment of the invention.

Generally speaking, the holding device constructed according to the invention consists of a permanent magnet connection arranged between the handle of the handset and a holding and supporting device. Therefore, it is possible to arrange the magnet on the long portion of the handset and to mount a plate therefor on the operator. When equipped with such a holding device, the telephone handset can be easily placed in the vicinity of the collar-bone and by swinging it out in a more or less wide angle from the support area can be brought into the most favorable position to the ear of the operator. The distance from the earpiece of the handset to the ear of the operator is adjustable by moving the portion of the holder which is attached to the handset over the portion mounted on the body of the operator. As a practical matter, a telephne handset mounted in this way can be brought to the ear of the operator immediately after lifting it from the cradle. It also can be maintained in place there without further attention so that the operator has his hands free for other kinds of work. At the end of the conversation the handset can be disconnected from the body support by tilting and returned to the cradle of the telephone. In order to provide for further adjustment, the holding device incorporates a universal point which makes it possible to move the elements of the device in any direction.

Figure 1:
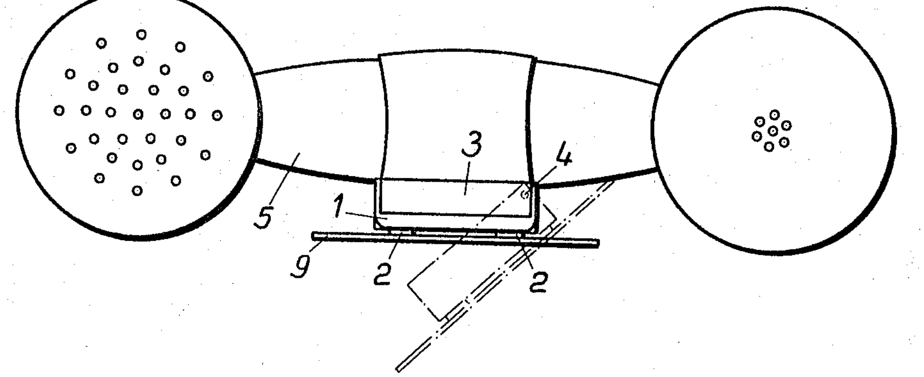
FIG. 1 is an elevational view of a telephone handset as observed from the speaking-and-hearing side showing mounted on the handle a portion of a holding device embodying the principles of the present invention.
Figure 2:
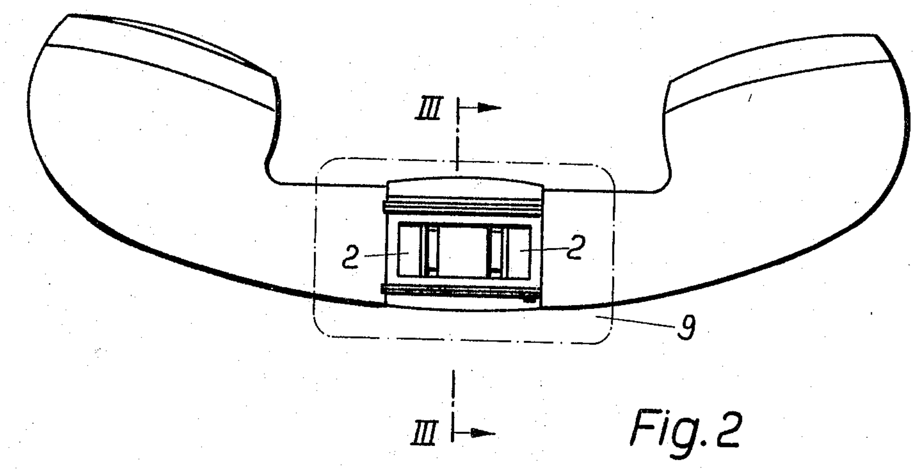
FIG. 2 is a side figure of the handset and holding device shown in FIG. 1.
Figure 3:
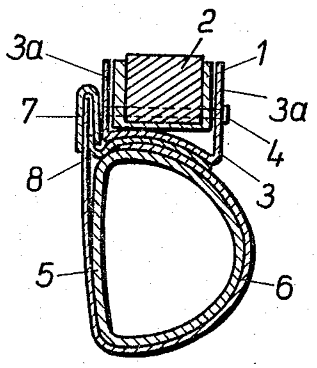
FIG. 3 is a sectional view taken on the line III—III of FIG. 2.

Referring to FIGS. 1, 2, and 3, it can be seen that the housing 1 for the permanent magnets 2 consists of a U-shaped sliding way 3 whose flanges spring against the sidewalls of the housing. It is, therefore, possible to swing the housing with the permanent magnets 2 away from the telephone handle 5 into a position shown, for example, in FIG. 1 in dotted lines. A flap 6 which is flexible and elastic is connected to the bottom of the way 3 and surrounds the handle 5 in the well-known manner. The free end of the flap 6 carries a hook 7 which is connected to corresponding ears arranged on the way 3. A connection plate 9 is shown in FIG. 1 and in dotted lines in FIG. 2.

Referring to FIGS. 4 and 5, a carrier 11 for permanent magnets 12 can be mounted on an elastic strap 13 placed around the neck of the operator. This carrier strap is formed of an elastic material and its free ends lay on the chest of the operator. As is shown in FIG. 9, the free ends of the strap are equipped with a cross bar 14 which is adjustable; when the person who wears the strap has to make additional working movements, an adjustment may be made. The surface of the strap, which lies against the garment of the operator, is provided with material used to prevent sliding, not shown. The carrier 11, which is mounted on the strap 13, is provided with a cantilever support 15, which rests on the body of the operator and prevents tilting. Preferably, this cantilever support is made from clear plastic and has the form of an oval disk.

The connection of plate 15*a* may be mounted on a formed piece 16 in the manner shown in FIG. 8. The formed piece is molded of elastic material and is provided with an elastic strap 17 mounted on the side of the formed piece; the two may be molded integrally. The free end 17*a* of the strap 17 is equipped with a slotted hole 18 and can be hooked to a wide hook 19 mounted on the other long side of the formed piece 16 after the elastic strap has been wrapped around the handle of the telephone.

Referring to FIG. 6, the pair of permanent magnets 12 is surrounded completely with the material of a carrier 20 with the exception of the area which is used for connection. The ball 20*a* of a ball joint is adjustable by means of a screw 21 and pressed against the walls 11*a*. As shown in FIG. 11, the same construction may use a threaded sleeve 28 extending between the ball 20*a* and the carrier 11. This permits a vertical adjustment of the magnets 2.

In FIG. 6, it can be seen that the carrier is in the form of a clamp 23 and can be mounted on the lapel of the operator. The part lying outside the lapel and carrying the ball support 11*a* has a clamp area 23 which is many times smaller than the clamp area 23*b* lying under the lapel. With the assistance of this clamp, it is possible to keep the outside part of the holding device small and concealed, whereas the part not shown gives good support against tilting forces from the handset.

According to another variation of the invention, the connection plate or the permanent magnet can be attached to a support arm consisting of a metallic flexible cable 24. The support arm would be connected at its free end to a supporting cable by means of a clamp, and it can also be mounted on a housing of the telephone. According to a modification shown in FIG. 12, the support arm can also consist of a ball joint 25 mounted on a switchboard 26 and having a telescoping mast 22 at the upper end of which is mounted the holding device 15*a*.

As can be seen from the above description, this holding device can be adapted to existing telephones without any difficulty. It becomes possible to bring the handset into the vicinty of the ear and to adjust it to the most comfortable position. When placed there, it remains without inhibiting the movements of both hands. For removal, it is only necessary to tilt the handset relative to the other part of the holder and the connection between the magnet and the plate is broken immediately. Experience shows that permanent magnets with a pulling force of 8 kilograms are especially advantageous. The adjustment of the ball in the joint permits, even after considerable use, a satisfactory adjustment of the receiver.

It is obvious that minor changes may be made in the form and construction of the invention without departing from the material spirit thereof. It is not desired, however, to confine the invention to the exact form herein described and shown, but it is desired to include all such as come within the scope claimed.

The invention having thus been described, what is claimed as new and desired to secure by Letters Patent is:

1. A holding device for a telephone handset, comprising (a) a first portion adapted to be fastened to the handset, (b) a second portion adapted to be fastened in a position accessible to the user, (c) permanent magnets mounted in one of the portions and having a limited area, (d) a plate mounted on the other of the portions and having an extensive area, whereby the magnets may be placed in a desired position on the plate with a wide range of selection.

2. A holding device for a telephone handset, as recited in claim 1, wherein the first portion is provided with a flexible strap extending around the handle of the handset and is provided with a connection part which is pivoted relative to the strap for adjustment of the connection between the first portion and the second portion.

3. A holding device for a telephone handset, as recited in claim 1, wherein the second portion is provided with a clamp which is adapted to clip on the lapel of the user's clothing with a small portion of the clamp on the outside of the lapel and a large portion on the inside of the lapel.

4. A holding device for a telephone handset, as recited in claim 1, wherein the said second portion is provided with a broad cantilever plate adapted to press against the shoulder of the user.

5. A holding device for a telephone handset, as recited in claim 1, wherein the said one of the portions is provided with an adjustable and lockable ball joint for adjusting the angularity of the permanent magnets.

No references cited.

KATHLEEN H. CLAFFY, *Primary Examiner.*

WILLIAM C. COOPER, *Examiner.*